(12) United States Patent
Luo et al.

(10) Patent No.: US 12,325,598 B2
(45) Date of Patent: Jun. 10, 2025

(54) MULTI-SAMPLE CONTAINER DISPOSAL MODULE AND DISPOSAL SYSTEM

(71) Applicants: NINGBO FIRST HOSPITAL, Ningbo (CN); ZHEJIANG GONGDONG MEDICAL TECHNOLOGY CO., LTD., Taizhou (CN)

(72) Inventors: Shoujun Luo, Ningbo (CN); Qinhong Xu, Ningbo (CN); Jianshuai Jiang, Ningbo (CN)

(73) Assignees: NINGBO FIRST HOSPITAL, Ningbo (CN); ZHEJIANG GONGDONG MEDICAL TECHNOLOGY CO., LTD., Taizhou (CN)

( * ) Notice: Subject to any disclaimer, the term of this patent is extended or adjusted under 35 U.S.C. 154(b) by 751 days.

(21) Appl. No.: 17/648,009

(22) Filed: Jan. 14, 2022

(65) Prior Publication Data

US 2022/0234842 A1 Jul. 28, 2022

(30) Foreign Application Priority Data

Jan. 26, 2021 (CN) .......................... 202110101437.4

(51) Int. Cl.
| | |
|---|---|
| *B01L 3/00* | (2006.01) |
| *B01F 33/302* | (2022.01) |
| *B01F 33/3033* | (2022.01) |
| *B01L 7/00* | (2006.01) |
| *B01L 9/00* | (2006.01) |
| *B65G 47/80* | (2006.01) |
| *C12Q 1/6848* | (2018.01) |
| *C12Q 1/686* | (2018.01) |

(Continued)

(52) U.S. Cl.
CPC ................ *B65G 47/80* (2013.01); *B01L 9/00* (2013.01); *B01L 2200/04* (2013.01); *B01L 2200/082* (2013.01); *B01L 2200/18* (2013.01); *B65G 2201/0235* (2013.01)

(58) Field of Classification Search
CPC ... B65G 47/80; B65G 2201/0235; B01L 9/00; B01L 2200/04; B01L 2200/082; B01L 2200/18; B65D 25/38; B65D 25/04; B65D 25/02; B41J 2/442; B41J 3/4073
See application file for complete search history.

(56) References Cited

FOREIGN PATENT DOCUMENTS

CN 207718498 U * 8/2018 .............. B41J 2/471

\* cited by examiner

*Primary Examiner* — Jennifer Wecker
*Assistant Examiner* — Oyeleye Alexander Alabi
(74) *Attorney, Agent, or Firm* — INNOVATION CAPITAL LAW GROUP, LLP; Vic Lin (57) ABSTRACT

A multi-sample container disposal module is provided with a discharging mechanism comprising a storage box, the storage box being internally provided with a storage space, wherein the storage space is divided into a first storage cavity and a second storage cavity via a partition plate in the storage space; a transition mechanism, two ends of which are respectively a receiving end and a discharging end, wherein the receiving end is provided with a receiving rack and the discharging end is provided with a rotating structure and a discharging plate, and a driving structure is arranged between the receiving rack and the rotating structure; and a printing mechanism located above the transition mechanism, wherein the printing mechanism comprises a laser head, and a position of an emission light source of the laser source corresponds to a position of the rotating structure up and down.

13 Claims, 11 Drawing Sheets

(51) Int. Cl.
*G01N 21/29* (2006.01)
*G01N 21/65* (2006.01)
*G01N 33/574* (2006.01)
*G01N 33/58* (2006.01)

MULTI-SAMPLE CONTAINER DISPOSAL MODULE AND DISPOSAL SYSTEM

BACKGROUND OF THE INVENTION

1. Technical Field

The present invention belongs to the technical field of medical instruments, and relates to a disposal module, in particular to a multi-sample container disposal module and a disposal system.

2. Description of Related Art

At present, a body fluid inspection flow in hospital outpatient clinics is as follows: a patient goes to an inspection window with an inspection list, a worker selects a container according to doctor's advice and explain preserving requirements, the patient comes to the window again after taking a sample, and the worker receives the sample, prints a bar code and pastes the bar code to the container, and meanwhile, the worker prints a receipt to the patient and inform a list taking time and location. There are following problems: 1, it is necessary for the patient to queue up long in a peak period and the waiting time is long; 2, various mistakes such as insufficient sample collection amount, wrong taking of the container and the like are caused by various reasons; 3, the workload is large, so that a mistake of confusing one thing with another is prone to happen; 4, when the sample is received, it is necessary to print the bar code with a patient ID card and paste the bar code to the container and the receipt is printed for the patient. As the sample may have biohazard to lead to probability of hospital-acquired infection, patients often complain; and 5, the detection speed is reduced as the bar codes pasted manually are inconsistent, and it cannot exert the maximum efficiency.

A Chinese patent (CN207718498U) discloses an outpatient service body fluid collecting self-service machine, including a rack at least provided with a transmission mechanism, two ends of the transmission mechanism being at least provided with a discharging mechanism and a laser printing mechanism respectively, wherein a position at the same end of the laser printing mechanism is at least provided with a rotating mechanism and the rotating mechanism and the laser printing mechanism are respectively located on the upper and lower sides of the transmission mechanism.

However, the discharging mechanism of the self-service machine only can store a certain sample container. If it is necessary to store two sample containers, it is necessary to increase the number of the discharging mechanism, thereby, the manufacturing cost of the disposal system is increased.

BRIEF SUMMARY OF THE INVENTION

Aiming at the above-mentioned problem, the objective of the present invention is to provide a disposal system capable of strengthening pre-analytical quality control, improving the work efficiency, reducing mistakes, avoiding the probability of hospital-acquired infection, shortening the inspection time, optimizing the treatment flow and improving the medical experience of the patient.

The objective of the present invention can be realized by the technical schemes as follows: a multi-sample container disposal module, including:

a discharging mechanism including a storage box, the storage box being internally provided with a storage space for storing a sample container and two ends of the storage space being respectively provided with a feeding end and a falling end, wherein the storage space is internally provided with a partition plate to divide the storage space into a first storage cavity and a second storage cavity;

a transition mechanism, two ends of which are respectively a receiving end and a discharging end, wherein the receiving end is provided with a receiving rack for receiving the sample container falling from the falling end, the discharging end is provided with a rotating structure that exposes a blank region on the sample container completely, and a driving structure that transports the sample container on the receiving rack to the rotating structure is arranged between the receiving rack and the rotating structure; and a printing mechanism located above the transition mechanism, wherein the printing mechanism comprises a laser head, and a position of an emission light source of the laser head source corresponds to a position of the rotating structure up and down.

In the multi-sample container disposal module, the feeding end is provided with a single feed inlet or two feed inlets, wherein when there are two feed inlets, the two feed inlets are respectively located in two sides of the storage box and are correspondingly communicated with the first storage cavity and the second storage cavity, respectively; and the discharging end is provided with a single discharge hole or two discharge holes, wherein when there are two discharge holes, the two discharge holes are formed in parallel and are communicated with the first storage cavity and the second storage cavity, respectively.

In the multi-sample container disposal module, the discharge hole is provided with a rotatable falling wheel, wherein a surface of the falling wheel is provided with a falling trough, and the falling trough is sunken towards a center of the falling wheel along a surface of the falling wheel.

In the multi-sample container disposal module, the partition plate includes a first baffle detachably connected to the storage box and a second baffle rotatably matched with the first baffle, wherein the feed inlet is movably connected with a door plank, and the door plank and the second baffle form a linking structure via a connecting rod.

In the multi-sample container disposal module, the receiving rack is provided with a fixed receiving plate and a movable receiving plate, and opposite sides of the fixed receiving plate and the movable receiving plate are respectively provided with guiding inclined planes that are respectively a first guiding inclined plane and a second guiding inclined plane, wherein a falling channel and a receiving trough are formed by opening and closing the first guiding inclined plane and the second guiding inclined plane.

In the multi-sample container disposal module, the discharging end is provided with a stopping arm and the stopping arm is located on a moving trajectory of the receiving rack, wherein the first guiding inclined plane and the second guiding inclined plane are opened and closed as the stopping arm and the movable receiving plate lean against each other or are separated from each other.

In the multi-sample container disposal module, the fixed receiving plate is matched with the movable receiving plate magnetically, wherein the fixed receiving plate is connected with a magnetic block, the movable receiving plate is connected with an ejector rod, and the ejector rod penetrates through the fixed receiving plate and the magnetic block and is spirally connected to the movable receiving plate.

In the multi-sample container disposal module, the receiving rack is connected with a pushing structure and the pushing structure is located between the receiving trough and the stopping arm, wherein two auxiliary rotating shafts are separated at a relative distance via the pushing structure.

In the multi-sample container disposal module, the pushing structure includes a pushing bracket and the pushing bracket is connected with ejector blocks in leaning fit with two ends of one of the auxiliary rotating shafts correspondingly, wherein each of the ejector blocks is provided with a first working inclined plane that pushes the auxiliary rotating shaft away and a second working inclined plane that restores the auxiliary rotating shaft, the first working inclined plane and the second working inclined plane being adjacent two inclined planes on the ejector blocks.

In the multi-sample container disposal module, the rotating assembly comprises a rotating bracket and the rotating bracket is provided with a third rotating motor, wherein an output end of the third rotating motor is connected with a primary rotating shaft and two auxiliary rotating shafts fitting the primary rotating shaft and being connected to the rotating bracket, and a "tripod"-shaped structure is formed between the primary rotating shaft and the two auxiliary rotating shafts, and wherein the two auxiliary rotating shafts are driven to rotate as the primary rotating shaft rotates.

In the multi-sample container disposal module, the primary rotating shaft is embedded with an annular magnetic ring, or the auxiliary rotating shafts are embedded with annular magnetic rings, or both the primary rotating shaft and the auxiliary rotating shafts are embedded with annular magnetic rings.

In the multi-sample container disposal module, a cavity wall of the storage cavity close to one end of the feed inlet is provided with a first guiding inclining plate, and the first baffle close to one end of the discharge hole is provided with a second guiding inclining plate.

In the multi-sample container disposal module, two sides of the door plank are respectively provided with sealing plates, wherein the sealing plates are located in the storage space or are embedded into side plates on two sides of the storage box.

The present invention further provides a multi-sample container disposal system, including a plurality of multi-sample container disposal modules, wherein the plurality of multi-sample container disposal modules are divided into two groups and transportation mechanisms are arranged between two groups of multi-sample container disposal modules.

Compared with the prior art, the present invention has the following beneficial effects:

(1) It is divided into two storage cavities via the partition plate to store two different sample containers, so that the internal space in the storage box is utilized flexibly, and therefore, the manufacturing cost of the disposal system is lowered. In addition, the discharging mechanism, the transition mechanism and the printing mechanism are matched automatically, so that the transfer number of times of the sample containers between the inspection staffs and the patients is reduced, and a wrong taking phenomenon is avoided. Furthermore, the sample containers are placed in the discharging mechanism in order to prevent pollution due to contact with outside, so that the storing safety and reliability of the sample containers are improved.

(2) Materials are supplemented to the first storage cavity and the second storage cavity by controlling the aperture of the door plank and matching linkage between the door plank and the second baffle, so that it is flexible and reliable to operate. In addition, in a process that the second baffle rotates around the first baffle, the first storage cavity and the second storage cavity are controlled strictly to prevent cross of the sample containers, so that the discharging precision and reliability are improved.

(3) The discharge hole can be plugged by a falling wheel, and combined with the falling trough on the falling wheel, the sample containers are discharged one by one, so that the discharging reliability is improved. In addition, the sample containers are embedded into the falling trough when the sample containers are discharged, so that it is guaranteed that in the rotating process of the falling wheel, the sample containers are extruded, and therefore, the discharging reliability of the sample containers is guaranteed.

(4) The fixed receiving plate and the movable receiving plate are matched magnetically, so that it is convenient to change the relative distance between the fixed receiving plate and the movable receiving plate, and therefore, the sample containers in the receiving trough can fall onto the rotating structure below reliably. In addition, the ejector rod and the fixed receiving plate are in clamping fit via a protruding portion on the ejector rod, so that the separating distance between the fixed receiving plate and the movable receiving plate is controlled, and therefore, the ejector rod is prevented from sliding out of the fixed receiving plate, thereby, the using reliability of the receiving rack is improved.

(5) By means of screw fit, the ejector rod is rotated to adjust the distance when the movable receiving plate is far away from the fixed receiving plate, so that it is suitable for discharging sample containers of different sizes, and therefore, it is guaranteed that when the movable receiving plate is far away from the fixed receiving plate, the sample containers in the receiving trough can fall onto the rotating structure below reliably.

(6) By means of the pushing structure, the printed sample containers located on the rotating structure are discharged, and the unprinted sample containers on the receiving trough fall onto the rotating structure by leaning the receiving trough against the stopping arm to fit so as to form a continuous action, so that the printing working efficiency of the sample containers is improved.

In the drawings, 100, discharging mechanism; 110, storage box; 111, first storage cavity; 112, second storage cavity; 113, feed inlet; 114, first discharge hole; 115, second discharge hole; 116, first guiding inclined plate; 117, side plate; 120, partition plate; 121, first baffle; 122, second baffle; 123, second guiding inclined plate; 130, door plank; 140, connecting rod; 150, driving piece; 160, sealing plate; 170, falling wheel; 171, falling trough; 180, first rotating motor; 190, second rotating motor;

200, transition mechanism; 210, receiving rack; 211, fixed receiving plate; 2111, first guiding inclined plane; 212, movable receiving plate; 2121, second guiding inclined plane; 213, magnetic block; 214, ejector rod; 2141, protruding portion; 220, rotating structure; 221, rotating bracket; 2211, first guide slot; 222, third rotating motor; 223, primary rotating shaft; 224, auxiliary rotating shaft; 2241, extension rod; 225, magnetic ring; 230, discharging plate; 240, driving structure; 241, transmission motor; 242, lead screw; 250, stopping arm; 251, stopping rod; 260, pushing structure; 261, pushing bracket; 2611, second guide slot; 262, ejector block; 2621, first working inclined plane; 2622, second working inclined plane; 263, rotating rod; 264, elastic piece; 265, fixed bar;

300, printing mechanism; 310, laser head; 400, transmission mechanism; 410, conveyor belt; 420, guide plate; 430, barrier plate.

DETAILED DESCRIPTION OF THE INVENTION

Specific embodiments of the present invention are described below, and further description on the technical scheme of the present invention is made below in combination with the drawings. The present invention is not limited to the embodiments.

As shown in FIG. 1 to FIG. 11, a multi-sample container disposal module provided by the present invention includes:
- a discharging mechanism 100 including a storage box 110, the storage box 110 being internally provided with a storage space for storing a sample container and two ends of the storage space being respectively provided with a feeding end and a falling end, wherein the storage space is internally provided with a partition plate 120 to divide the storage space into a first storage cavity 111 and a second storage cavity 112;
- a transition mechanism 200, two ends of which are respectively a receiving end and a discharging end, wherein the receiving end is provided with a receiving rack 210 for receiving the sample container falling from the falling end, the discharging end is provided with a rotating structure 220 that exposes a blank region on the sample container completely and a discharging plate 230, and a driving structure 240 that transports the sample container on the receiving rack 210 to the rotating structure 220 is arranged between the receiving rack 210 and the rotating structure 220; and
- a printing mechanism 300 located above the transition mechanism 200, wherein the printing mechanism 300 comprises a laser head 310, and a position of an emission light source of the laser head 310 corresponds to a position of the rotating structure 220 up and down.

The multi-sample container disposal module provided by the present invention is divided into two storage cavities via the partition plate 120 to store two different sample containers, so that the internal space in the storage box 110 is utilized flexibly, and therefore, the manufacturing cost of the disposal system is lowered. In addition, the discharging mechanism 100, the transition mechanism 200 and the printing mechanism 300 are matched automatically, so that the transfer number of times of the sample containers between the inspection staffs and the patients is reduced, and a wrong taking phenomenon is avoided. Furthermore, the sample containers are placed in the discharging mechanism 100 in order to prevent pollution due to contact with outside, so that the storing safety and reliability of the sample containers are improved.

Preferably, as shown in FIG. 1 to FIG. 11, in order to improve the work efficiency, it is provided with a plurality of discharging mechanisms 100, a plurality of transition mechanisms 200 and a plurality of printing mechanisms 300, and the discharging mechanisms 100, the transition mechanisms 200 and the printing mechanisms 300 correspond one by one in quantity to form a plurality of multi-sample container disposal modules. The plurality multi-sample container disposal modules are divided into two groups, and a transportation mechanism 400 is arranged between the two groups, so that the two groups discharge via the same transportation mechanism 400, thereby realizing a connection between the two groups. The transportation mechanism 400 includes a conveyor belt 410, two sides of the conveyor belt 410 are provided with guide plates 420, and the guide plates 420 are in abut joint to the discharging plate 230.

Figure 1:
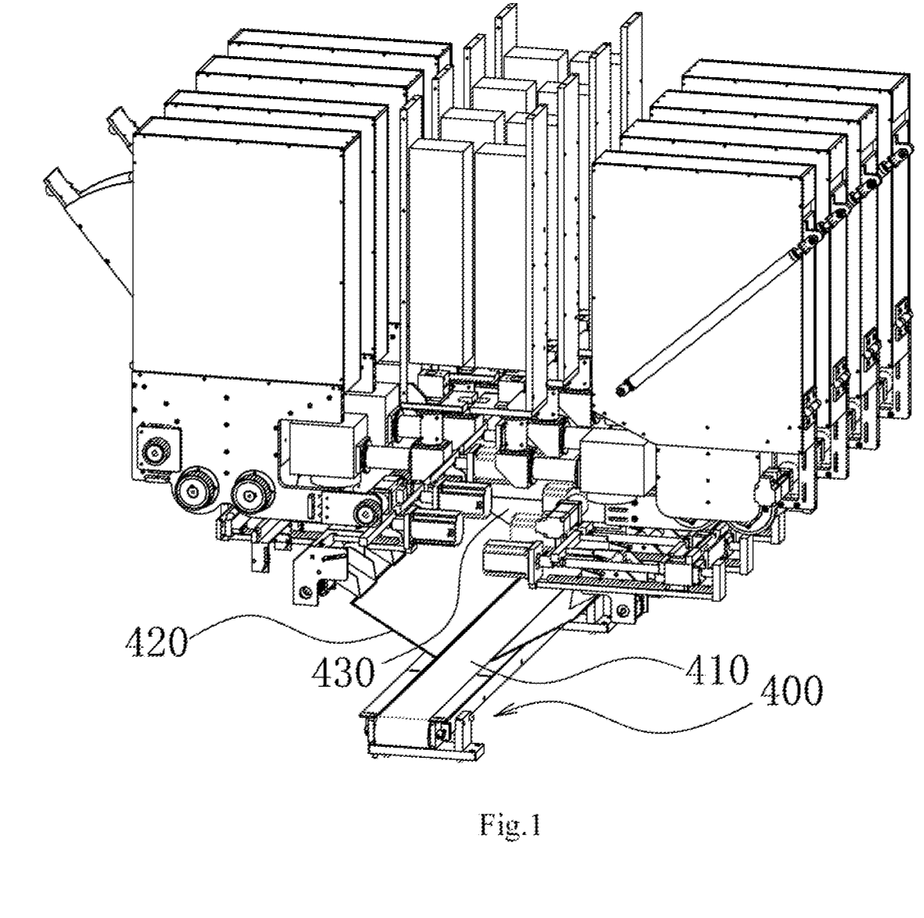
FIG. 1 is a structural schematic diagram of a multi-sample container disposal system of the present invention.
Figure 2:
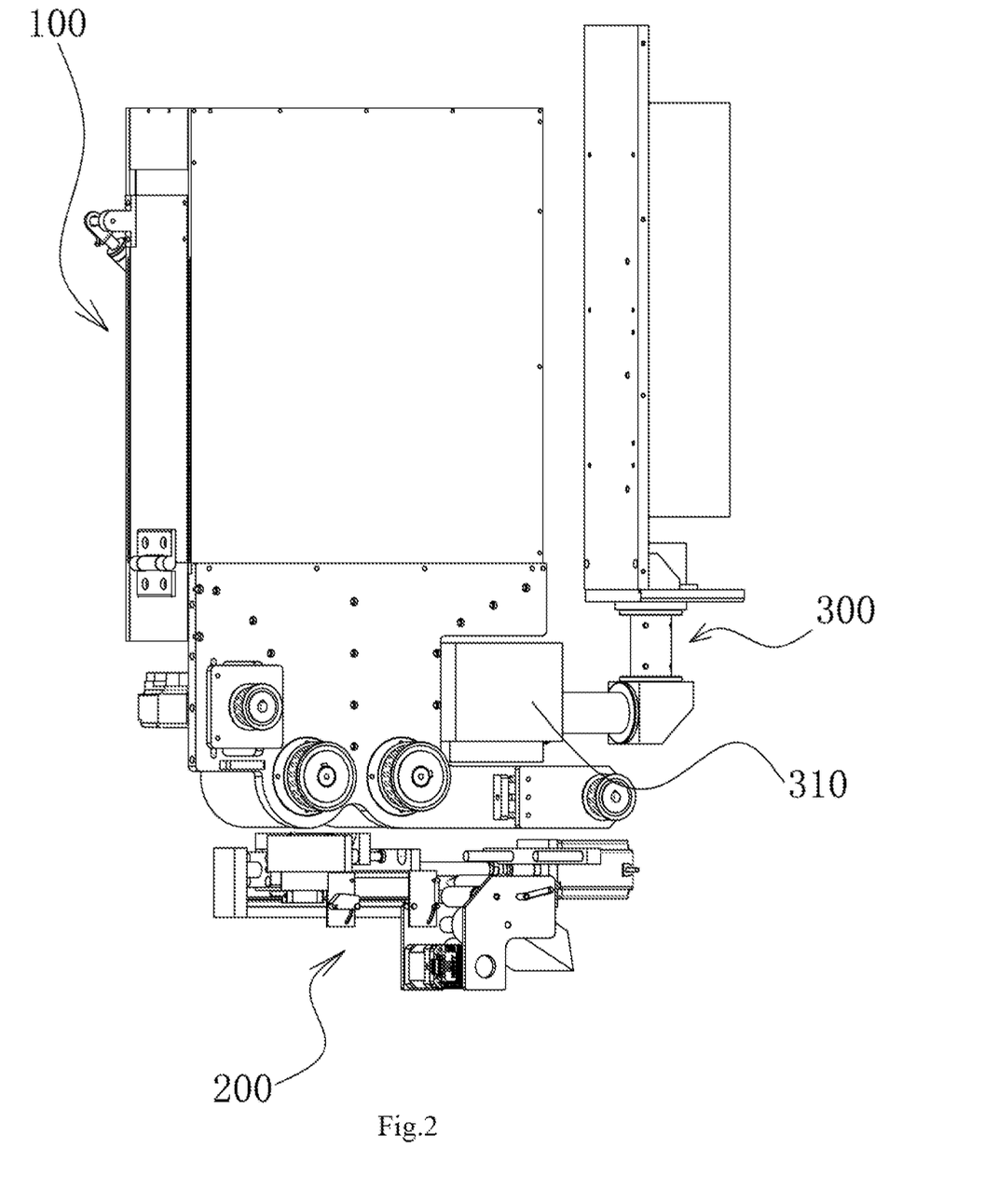
FIG. 2 is a structural schematic diagram of a multi-sample container disposal module of the present invention.

Further preferably, one end of the conveyor belt 410 is provided with a barrier plate 430 between the two guide plates 420, thereby, reliable output of the sample container is guaranteed.

Preferably, as shown in FIG. 1 to FIG. 11, when the feeding end is provided with two feed inlets 113 and the falling end is provided with one discharge hole, the two feed inlets 113 are respectively a first feed inlet 113 and a second feed inlet 113, and the first feed inlet 113 and the second feed inlet 113 are formed in two sides of the storage box 110, wherein the first storage cavity 111 is formed between the first feed inlet 113 and the discharge hole and the second storage cavity 112 is formed between the second feed inlet 113 and the discharge hole. When the feeding end is provided with one feed inlet 113 and the falling end is provided with two discharge holes, the two discharge holes are respectively a first discharge hole 114 and a second discharge hole 115, and the first discharge hole 114 and the second discharge hole 115 are formed in parallel, wherein the first storage cavity 111 is formed between the first feed inlet 113 and the first discharge hole 114 and the second storage cavity 112 is formed between the second feed inlet 113 and the second discharge hole 115. When the feeding end is provided with two feed inlets 113 and the falling end is provided with two discharge holes, the two feed inlets 113 are respectively a first feed inlet 113 and a second feed inlet 113, and the two discharge holes are respectively a first discharge hole 114 and a second discharge hole 115, wherein the first storage cavity 111 is formed between the first feed inlet 113 and the first discharge hole 114 and the second storage cavity 112 is formed between the second feed inlet 113 and the second discharge hole 115.

Preferably, as shown in FIG. 1 to FIG. 11, the partition plate 120 includes a first baffle 121 detachably connected to the storage box 110 and a second baffle 122 rotatably matched with the first baffle 121, wherein the feed inlet 113 is movably connected with a door plank 130, and the door plank 130 and the second baffle 122 form a linking structure via a connecting rod 140.

Figure 3:
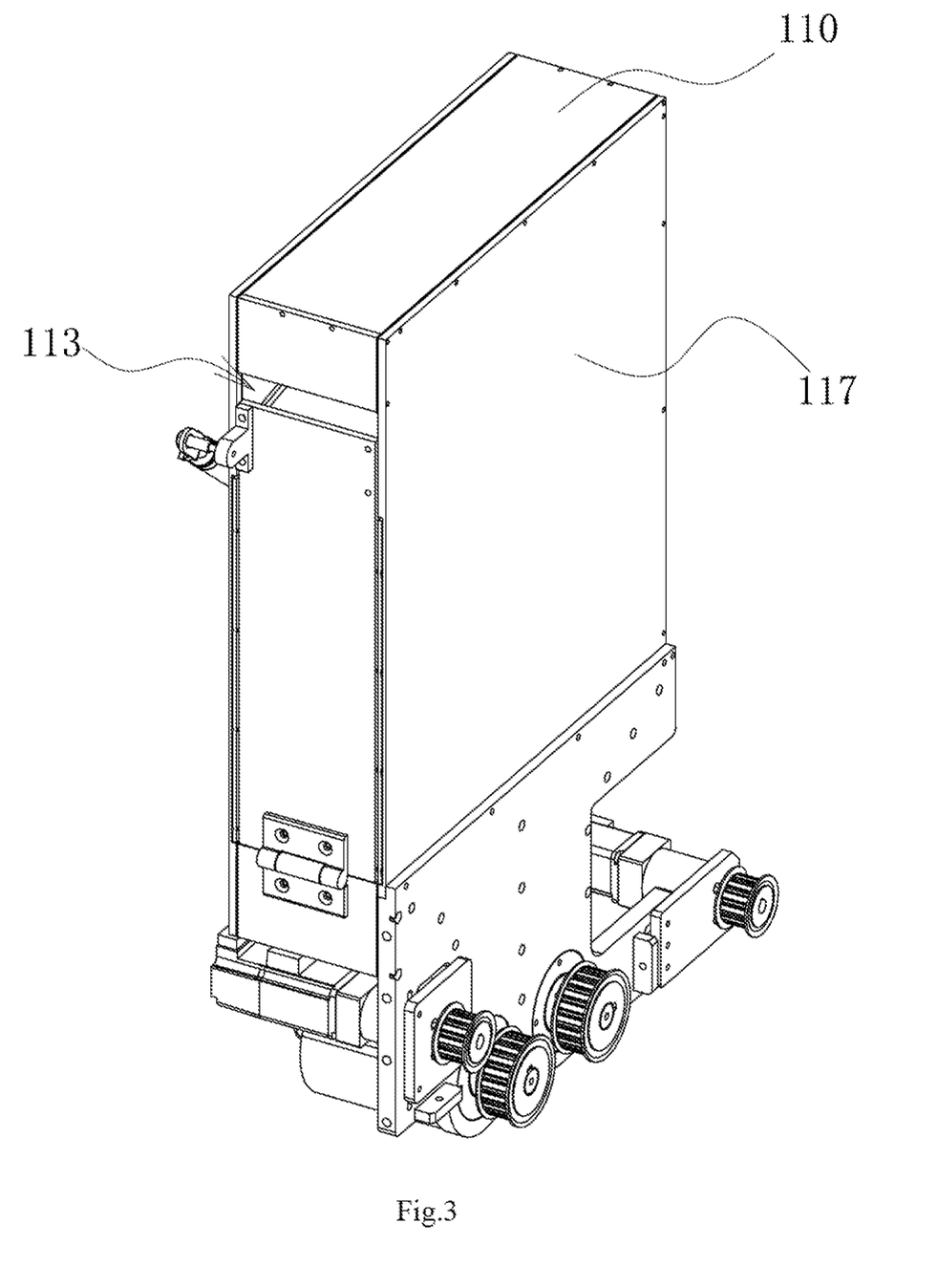
FIG. 3 is a structural schematic diagram of a discharging mechanism in an unopened state in a preferred embodiment of the present invention.
Figure 4:
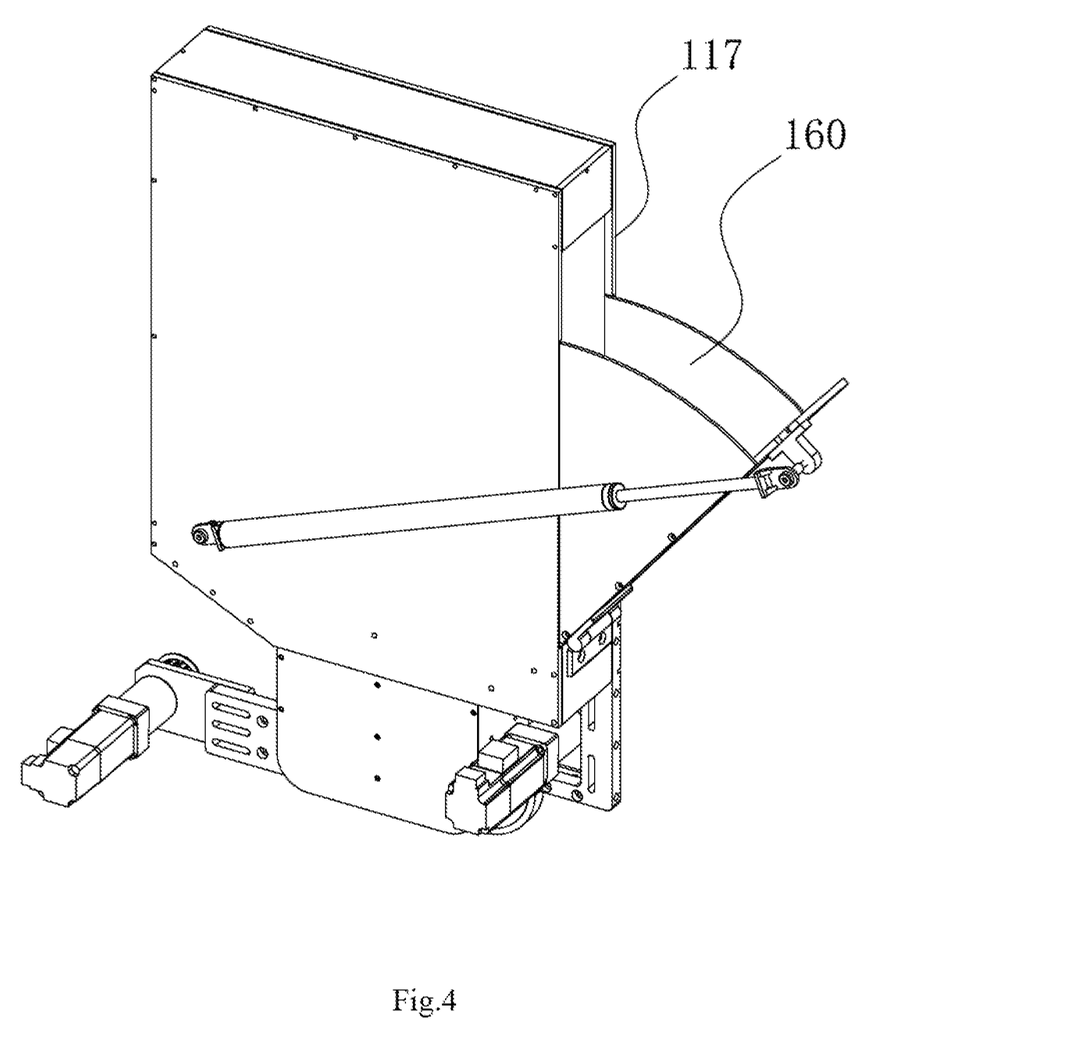
FIG. 4 is a structural schematic diagram of a discharging mechanism in an opened state in a preferred embodiment of the present invention.

In the embodiment, the first baffle 121 is connected with the second baffle 122 via a hinge so as to form a rotating structure between the first baffle 121 and the second baffle 122. The second baffle 122 is connected with the door plank 130 via the connecting rod 140 to form a linkage. The door plank 130 is opened to pull the second baffle 122 to rotate. When the door plank 130 is in a semi-opened state, the aperture of the first storage cavity 111 close to one end of the feed inlet 113 is decreased and the aperture of the second storage cavity 112 close to one end of the feed inlet 113 is increased, and at the time, corresponding sample containers are supplemented into the second storage cavity 112. When the door plank 130 is in a fully opened state, the aperture of the first storage cavity 111 close to one end of the feed inlet 113 is maximum, the end of the second storage cavity 112 close to the feed inlet 113 is covered by the second baffle 122 to be closed, and at the time, corresponding sample containers are supplemented into the first storage cavity 111.

In the embodiment, when the first storage cavity 111 and the second storage cavity 112 share one feed inlet 113, materials are supplemented to the first storage cavity 111 and the second storage cavity 112 by controlling the aperture of the door plank 130 and matching linkage between the door plank 130 and the second baffle 122, so that it is flexible and reliable to operate. In addition, in a process that the second baffle 122 rotates around the first baffle 121, the first storage cavity 111 and the second storage cavity 112 are controlled strictly to prevent cross of the sample containers, so that the discharging precision and reliability are improved.

Figure 5:
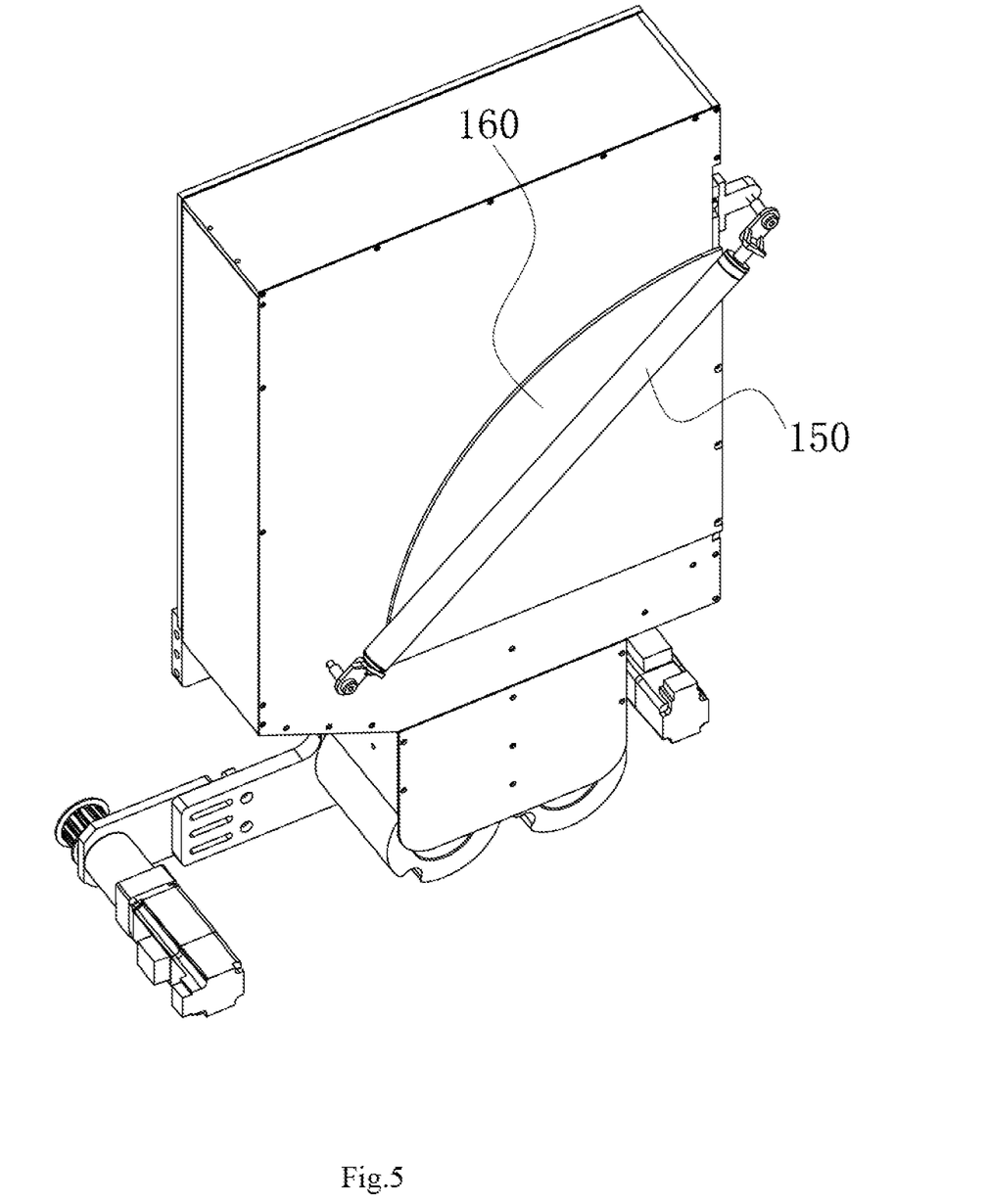
FIG. 5 is a local structural schematic diagram I of a discharging mechanism in a preferred embodiment of the present invention.
Figure 6:
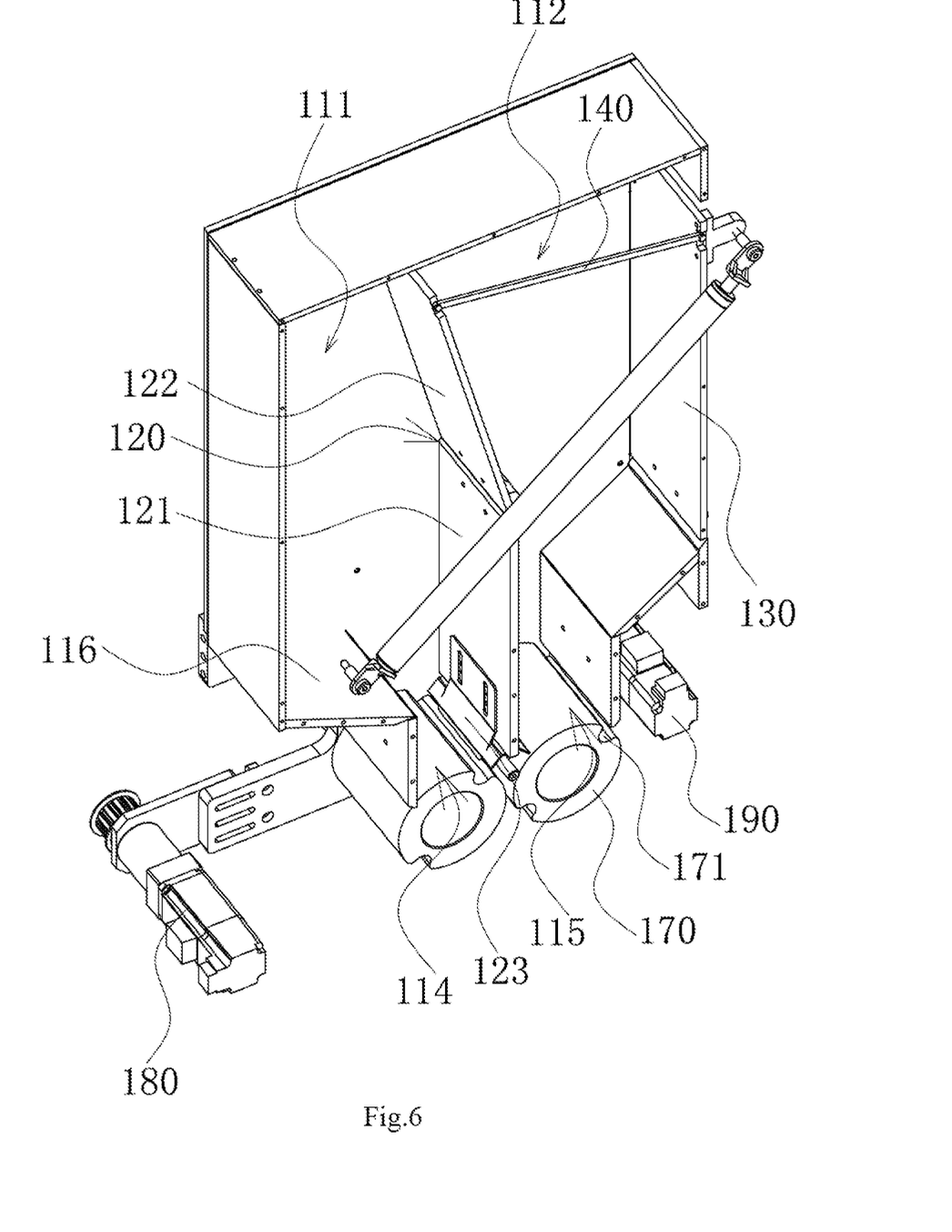
FIG. 6 is a local structural schematic diagram II of a discharging mechanism in a preferred embodiment of the present invention.

Further preferably, a cavity wall of the storage cavity close to one end of the feed inlet 113 is provided with a first guiding inclining plate 116, and the first baffle 121 close to one end of the discharge hole is provided with a second guiding inclining plate 123, so that the sample containers can be discharged smoothly from the discharge hole.

Preferably, as shown in FIG. 1 to FIG. 11, the door plank 130 is rotatably connected to the feed inlet 113, wherein the storage box 110 is provided with a driving piece 150 (for example, an air cylinder), and the door plank 130 is driven by the driving piece 150 to rotate, so that the aperture of the feed inlet 113 is changed.

In the embodiment, the door plank 130 is driven by the air cylinder to rotate to open and close the door plank 130 automatically so as to avoide the door plank 130 to rotate automatically as the number of the sample containers in the second storage cavity 112 is increased, thereby, the storing reliability of the sample containers is guaranteed.

Further preferably, there are two driving pieces 150 which are respectively located on two sides of the door plank 130, wherein one end of each of the driving pieces 150 is mounted on the storage box 110 and the other end of the driving piece 150 is connected with the door plank 130. By arranging the two driving pieces 150, it is ensured that the door plank 130 is reliable when being opened or closed.

Preferably, as shown in FIG. 1 to FIG. 11, two sides of the door plank 130 are respectively provided with sealing plates 160, wherein the sealing plates 160 are located in the storage space or are embedded into side plates 117 on two sides of the storage box 110.

In the embodiment, as the two sides of the door plank 130 are provided with the sealing plates 160, the sample containers are prevented from falling from an opening of the door plank 130 when materials are supplemented into the storage cavities, so that the material supplementing reliability of the sample containers is improved.

Preferably, as shown in FIG. 1 to FIG. 11, the first discharge hole 114 and the second discharge hole 115 are each provided with a rotatable falling wheel 170, wherein the surface of the falling wheel 170 is provided with a falling trough 171.

In the embodiment, the discharge hole can be plugged by the falling wheel 170, and combined with the falling trough 171 on the falling wheel 170, the sample containers are discharged one by one, so that the discharging reliability is improved. In addition, the sample containers are embedded into the falling trough 171 when the sample containers are discharged, so that it is guaranteed that in the rotating process of the falling wheel 170, the sample containers are extruded, and therefore, the discharging reliability of the sample containers is guaranteed.

Preferably, as shown in FIG. 1 to FIG. 11, the falling wheel 170 mounted at the first discharge hole 114 is driven by the first rotating motor 180 and the falling wheel 170 mounted at the second discharge hole 115 is driven by the second rotating motor 190.

Preferably, as shown in FIG. 1 to FIG. 11, the receiving rack 210 is provided with a fixed receiving plate 211 and a movable receiving plate 212, and opposite sides of the fixed receiving plate 211 and the movable receiving plate 212 are respectively provided with guiding inclined planes that are respectively a first guiding inclined plane 2111 and a second guiding inclined plane 2121, wherein a falling channel and a receiving trough are formed by opening and closing the first guiding inclined plane 2111 and the second guiding inclined plane 2121.

Figure 7:
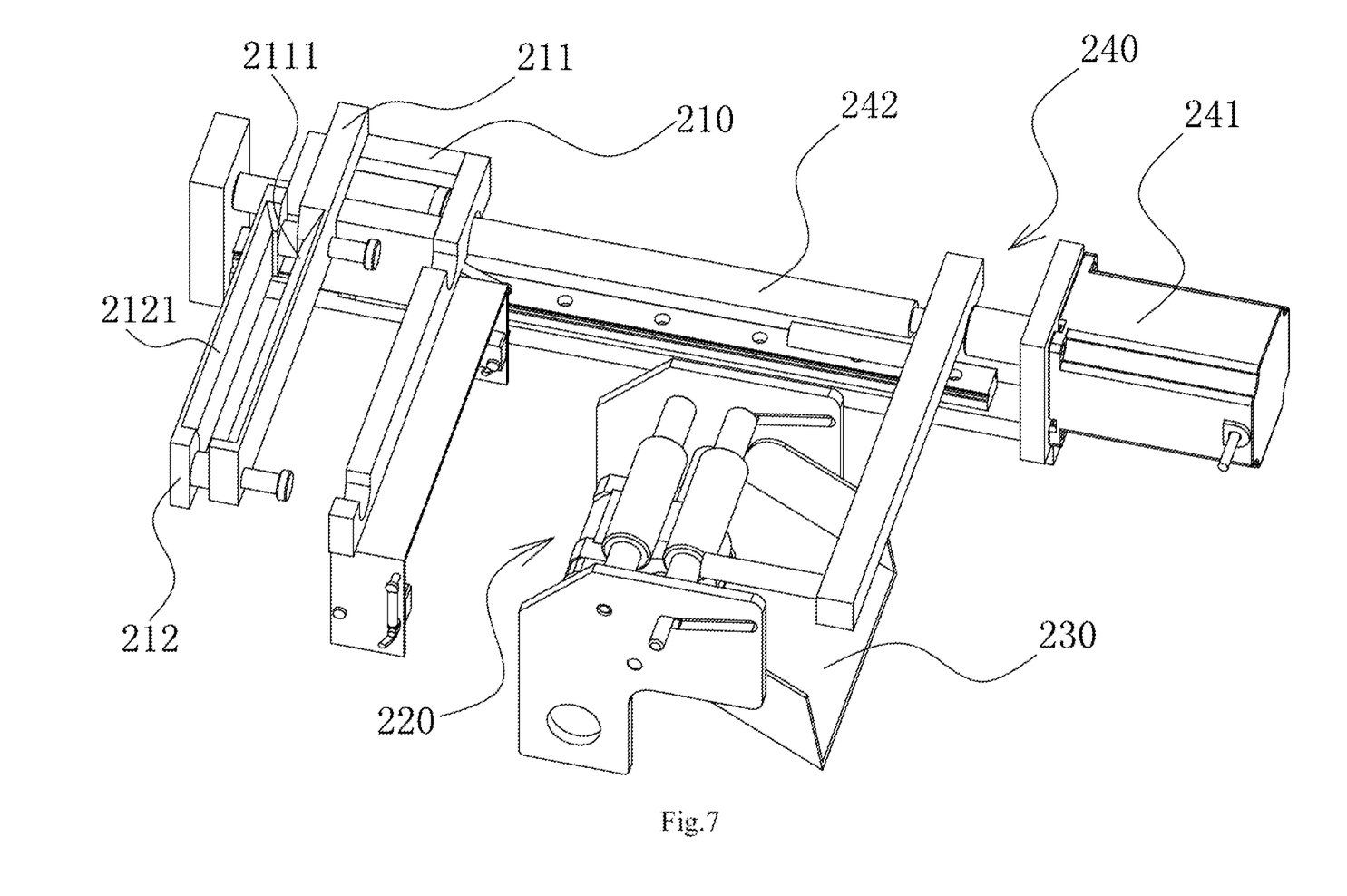
FIG. 7 is a structural schematic diagram of a transition mechanism in a preferred embodiment of the present invention.
Figure 8:
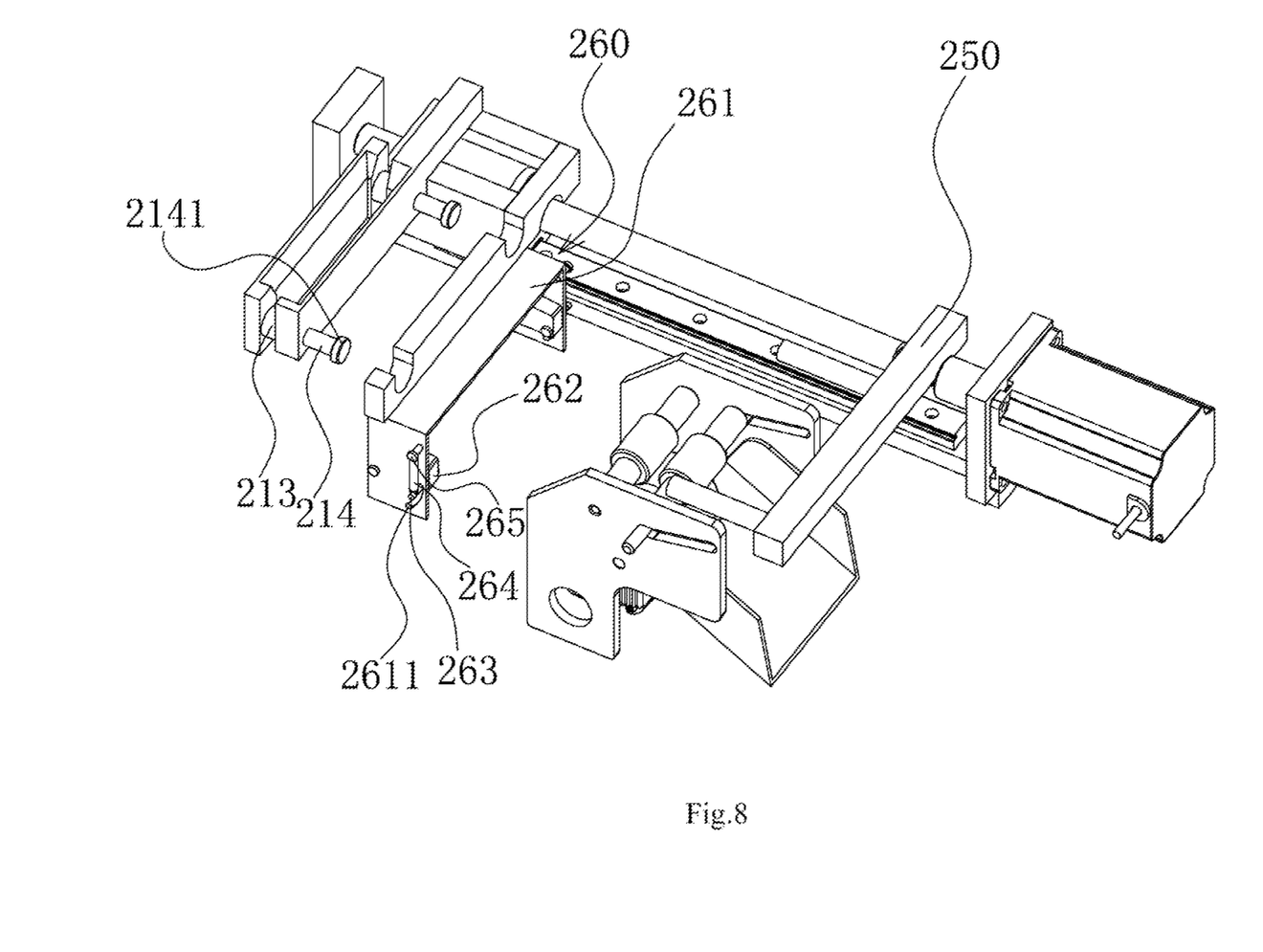
FIG. 8 is a local structural schematic diagram of a transition mechanism in a preferred embodiment of the present invention.
Figure 9:
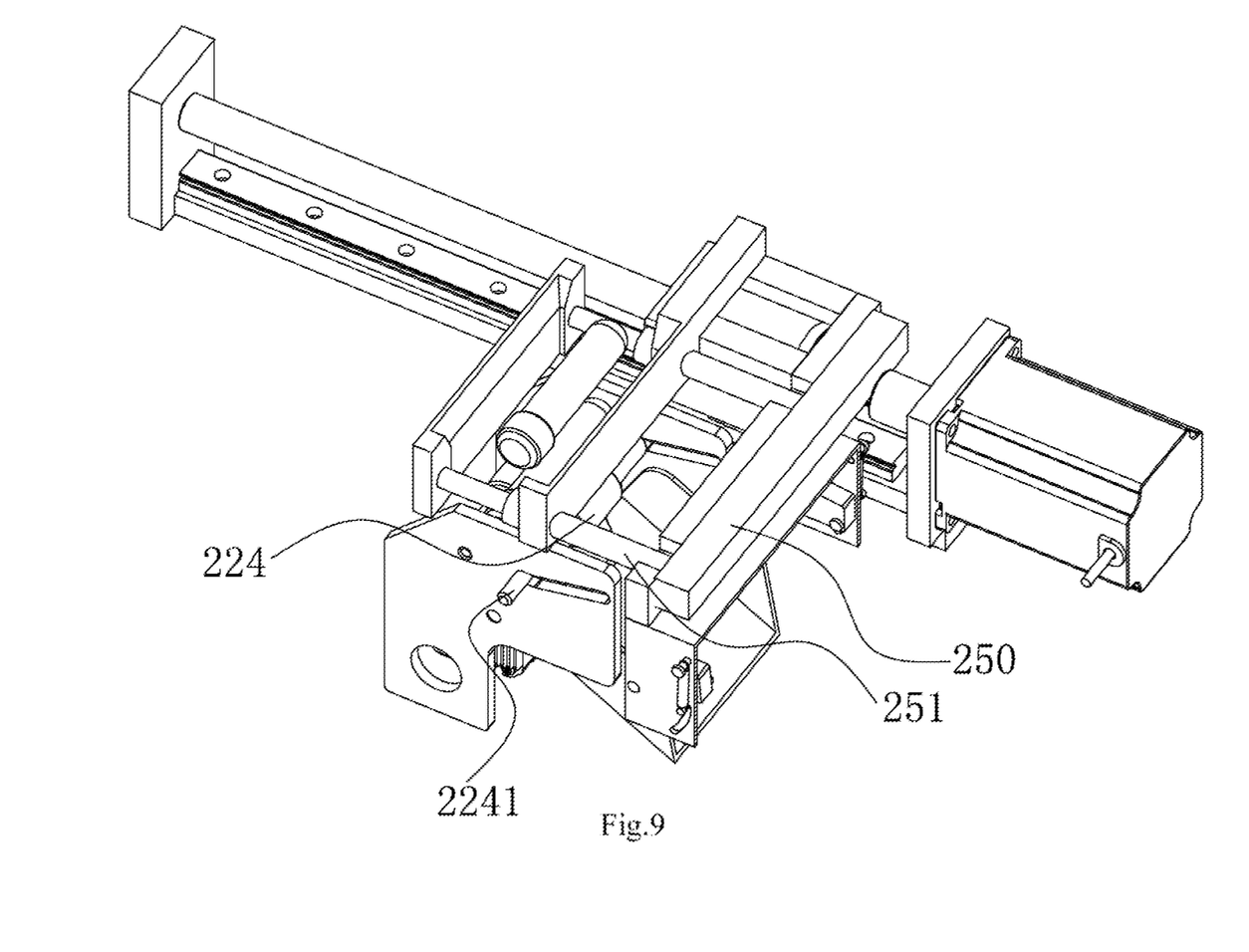
FIG. 9 is a structural schematic diagram of a sample container in a receiving rack falling to a rotating structure in a preferred embodiment of the present invention.

In the embodiment, in an initial state, the fixed receiving plate 211 and the movable receiving plate 212 are in a merged state, and at the time. the first guiding inclined plane 2111 and the second guiding inclined plane 2121 are spliced to form the receiving trough, the receiving trough is formed below the falling end and also can receive the sample containers falling from the falling end. Then the sample containers in the receiving groove are conveyed above the rotating structure 220 via the driving structure 240, then the movable receiving plate 212 moves along a direction away from the fixed receiving plate 211 to increase the relative distance between the movable receiving plate 212 and the fixed receiving plate 211, and at the time, the first guiding inclined plane 2111 and the second guiding inclined plane 2121 are separated to form the falling channel, so that the sample containers fall onto the rotating structure 220. Finally, the sample containers are driven by the rotating structure 220 to rotate, so that the blank region on the sample container is in a fully exposed state, and it is convenient to print patient information fully in the blank region of the sample container via the printing mechanism 300, so that the printing quality is improved, and the work efficiency of scanning and registering the sample containers by medical staffs subsequently is improved.

Further preferably, the discharging end is provided with a stopping arm 250 and the stopping arm 250 is located on a moving trajectory of the receiving rack 210, wherein the stopping arm 250 and the movable receiving plate 212 lean against each other to fit so as to separate the movable receiving plate 212 from the fixed receiving plate 211.

Preferably, as shown in FIG. 1 to FIG. 11, the fixed receiving plate 211 and the movable receiving plate 212 are matched magnetically.

Further preferably, two ends of the fixed receiving plate 211 each are connected with magnetic blocks 213, and two ends of the movable receiving plate 212 each are connected with ejector rods 214, wherein one end of each of the ejector rods 214 penetrates through the fixed receiving plate 211 and the magnetic blocks 213 and is connected to the movable receiving plate 212, and the other end of the ejector rod 214 is provided with a protrusion portion 2141.

Preferably, the stopping arm 250 is arranged in a U-shaped, and a stopping rod 251 is respectively provided on two sides of the opened end of the stopping arm 250, wherein the stopping rod 251 and the stopping arm 250 lean against each other to fit.

In the embodiment, the fixed receiving plate 211 and the movable receiving plate 212 are matched magnetically, so that it is convenient to change the relative distance between the fixed receiving plate 211 and the movable receiving plate 212, and therefore, the sample containers in the receiving trough can fall onto the rotating structure 220 below reliably. In addition, the ejector rod 214 and the fixed receiving plate 211 are in clamping fit via a protruding portion 2141 on the ejector rod 214, so that the separating distance between the fixed receiving plate 211 and the movable receiving plate 212 is controlled, and therefore, the ejector rod 214 is prevented from sliding out of the fixed receiving plate 211, thereby, the using reliability of the receiving rack 210 is improved.

Further preferably, the ejector rod 214 and the movable receiving plate 212 are in screw fit.

In the embodiment, by means of screw fit, the ejector rod 214 is rotated to adjust the distance when the movable receiving plate 212 is far away from the fixed receiving plate 211, so that it is suitable for discharging sample containers of different sizes, and therefore, it is guaranteed that when the movable receiving plate 212 is far away from the fixed receiving plate 211, the sample containers in the receiving trough can fall onto the rotating structure 220 below reliably.

Preferably, as shown in FIG. 1 to FIG. 11, the driving structure 240 includes a transmission motor 241, and the output end of the transmission motor 241 is connected with a lead screw 242, wherein the receiving rack 210 is spirally connected to the lead screw 242.

Preferably, as shown in FIG. 1 to FIG. 11, the rotating structure 220 includes a rotating bracket 221 and the rotating bracket 221 is provided with a third rotating motor 222, wherein an output end of the third rotating motor 222 is connected with a primary rotating shaft 223 and two auxiliary rotating shafts 224 fitting the primary rotating shaft 223 and being connected to the rotating bracket 221, and a "tripod"-shaped structure is formed between the primary rotating shaft 223 and the two auxiliary rotating shafts 224, and wherein the two auxiliary rotating shafts 224 are driven to rotate as the primary rotating shaft 223 rotates, so that the sample container located between the two auxiliary rotating shafts 224 rotates, and therefore, the blank region on the sample container is fully in the exposed state, and it is convenient to print patient information in the blank region by the printing mechanism 300.

Figure 10:
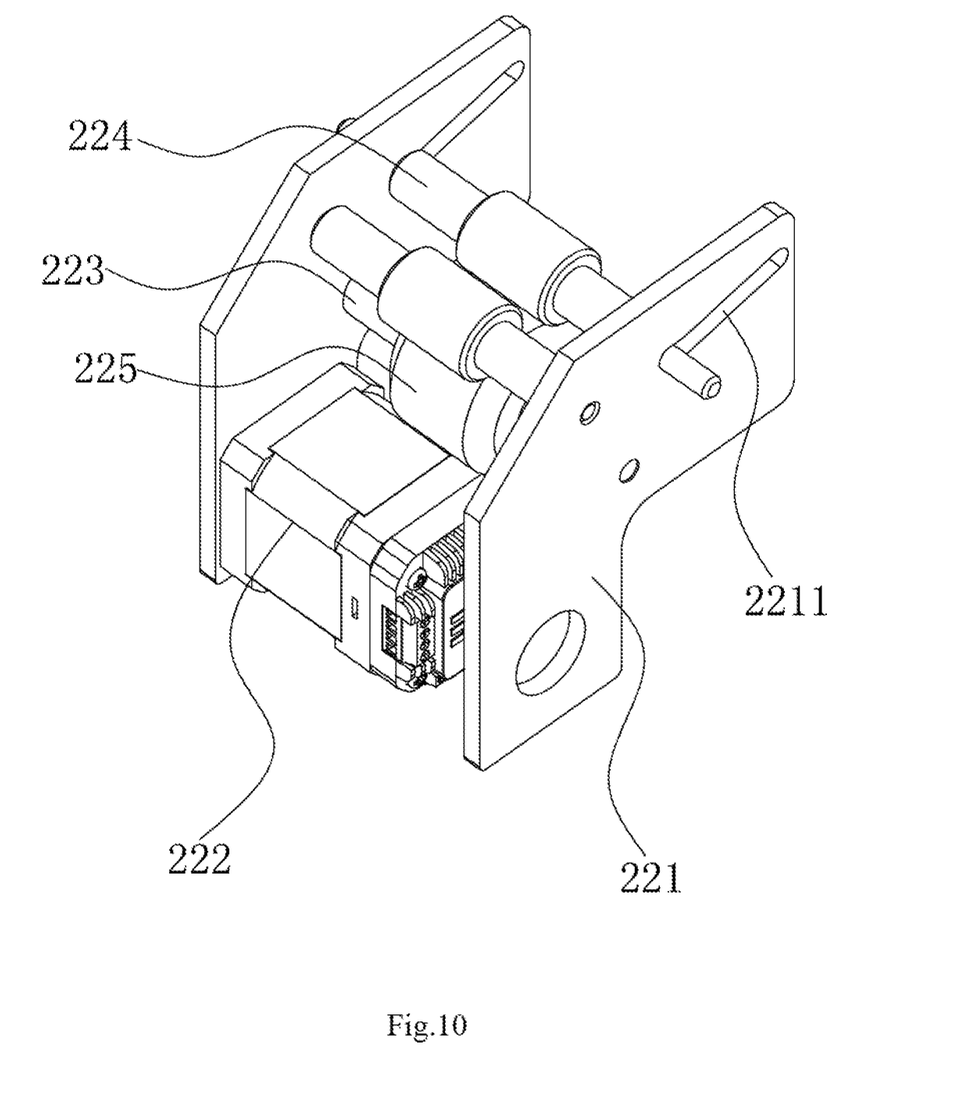
FIG. 10 is a structural schematic diagram of a rotating mechanism in a preferred embodiment of the present invention.

Further preferably, the primary rotating shaft 223 is embedded with an annular magnetic ring 225, or the auxiliary rotating shafts 224 are embedded with annular magnetic rings 225, or both the primary rotating shaft 223 and the auxiliary rotating shafts 224 are embedded with annular magnetic rings 225.

In the embodiment, as the primary rotating shaft 223 or the auxiliary rotating shafts 224 are embedded with the annular magnetic rings 225, an idle stroke is avoided when the primary rotating shaft 223 drives the auxiliary rotating shafts 224 to rotate, so that the rotating reliability of the sample containers is improved.

As shown in FIG. 1 to FIG. 11, the receiving rack 210 is connected with a pushing structure 260 and the pushing structure 260 is located between the receiving trough and the stopping arm 250, wherein two auxiliary rotating shafts 224 are separated at a relative distance via the pushing structure 260, thereby, the printed sample containers are discharged automatically.

Figure 11:
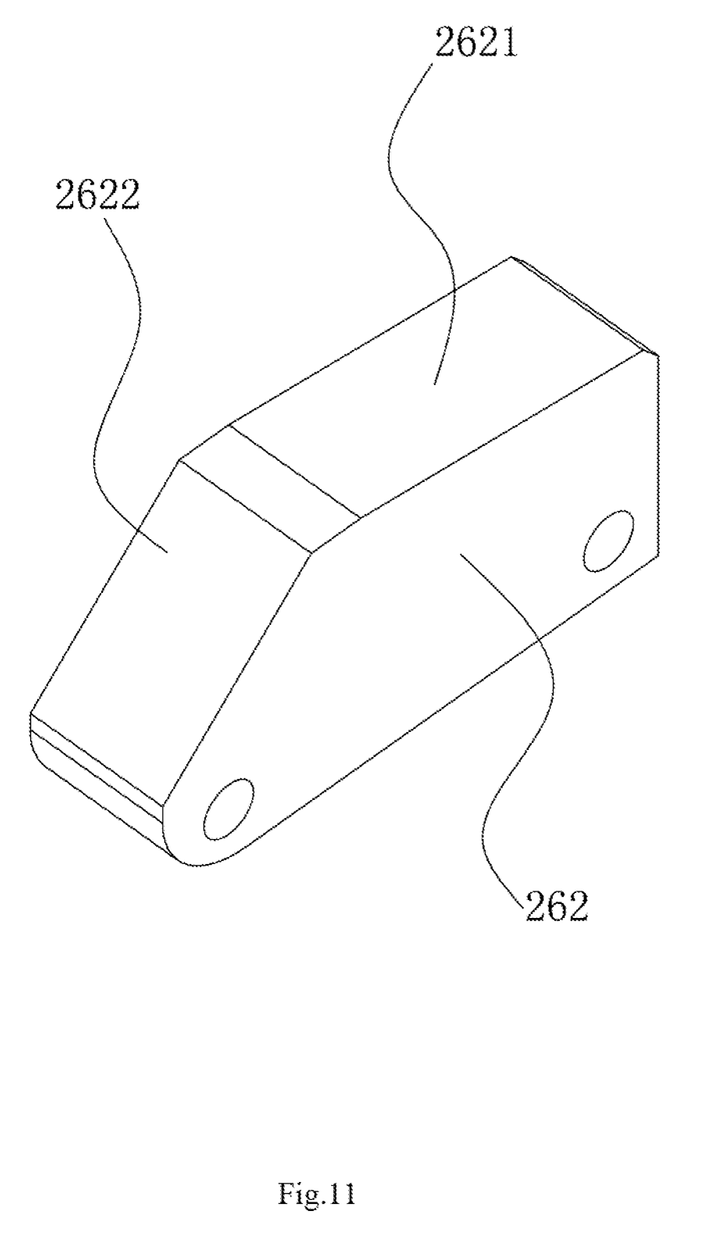
FIG. 11 is a structural schematic diagram of an ejector block in a preferred embodiment of the present invention.

In the embodiment, by means of the pushing structure 260, the printed sample containers located on the rotating structure 220 are discharged, and the unprinted sample containers on the receiving trough fall onto the rotating structure 220 by leaning the receiving trough against the stopping arm 250 to fit so as to form a continuous action, so that the printing working efficiency of the sample containers is improved.

Further preferably, the pushing structure 260 includes a U-shaped pushing bracket 261, and two sides of the opened end of the U-shaped pushing bracket 261 are each connected with an ejector block 262, an extension rod 2241 is respectively provided on two ends of one of the auxiliary rotating shaft 224, and two extension rod 2241 respectively form abutting fit with the ejector block 262 on the corresponding side.

Further preferably, each of two sides of the rotating bracket 221 is provided with a first guide slot 2211, and two extension rod 2241 are respectively clamped into the corresponding first guide slots 2211.

In the embodiment, the rotating bracket 221 is provided with the first guide slot 2211, so that when the ejector block 262 pushes the extension rod 2241 of auxiliary rotating shaft 224, two ends of the auxiliary rotating shaft 224 to move along the first guide slot 2211. The moving linearity of the auxiliary rotating shaft 224 is guaranteed, so that the printed sample containers are discharged smoothly.

Preferably, as shown in FIG. 1 to FIG. 11, two ends of the ejector block 262 are connected to the U-shaped pushing support 261 via corresponding rotating rods 263, the rotating rod 263 on the U-shaped pushing support 261 away from the side of the receiving trough is in clamping connection with the second guide slot 2611 in the U-shaped pushing support 261, the rotating rod on the U-shaped pushing support 261 close to the side of the receiving trough as a fulcrum when the ejector block 262 rotates, wherein the end of the rotating rod 263 in clamping connection with the second guide slot 2611 is connected with the fixed bar 265 on the U-shaped pushing bracket 261 via the elastic piece 264, the ejector block 262 is provided with the first working inclined plane 2621 and the second working inclined plane 2622, a slope gradient of the first working inclined plane 2621 extends obliquely upwards from the end away from the receiving trough to the end of the receiving trough, the slope gradient of the second working inclined plane 2622 extends obliquely upwards from the end close to the receiving trough to the end of the receiving trough, and the slope gradient of the first working inclined plane 2621 is smaller than that of the second working inclined plane 2622.

In the embodiment, when the pushing structure 260 is close to the rotating structure 220, the first working inclined plane 2621 is in rolling fit with the end portion of the auxiliary rotating shaft 224. Along with progressive increase of the slope gradient on the first working inclined plane 2621, the auxiliary rotating shaft 224 is pushed to move along the first guide slot 2211, and the auxiliary rotating shaft 224 generates a downward pressure to the ejector block 262 to drive the rotating rod 263 in clamping connection to the second guide slot 2611 to move along the second guide slot 2611, since the rotating rod close to the side of the receiving trough is fixed, the rotating rod 263 away from the side of the receiving trough moves along the second guide slot 2611, so that the ejector block 262 deflects. When the auxiliary rotating shaft 224 bestrides the second working inclined plane 2622 from the first working inclined plane 2621, as the slope gradient of the second working inclined plane 2622 is greater than that of the first working inclined plane 2621, rolling connection between the auxiliary rotating shaft 224 and the first working inclined plane 2621 is relieved, the auxiliary rotating shaft 224 falls back, and at the time, the completed sample containers are discharged.

A working principle of the multi-sample container disposal module provided by the invention is as follows: in an initial state, the unprinted sample container is mounted in the storage cavity, when a user inputs patient information such as a medical insurance card or a patient ID card, the falling wheel 170 rotates under the action of the rotating motor to fall the unprinted sample containers corresponding to the storage cavities in the falling trough 171 of the falling wheel 170. Along with rotation of the falling wheel 170, the unprinted sample containers fall from the falling trough 171 and enter the receiving trough below, and then the transmission motor 241 drives the lead screw 242 to rotate, so that the receiving rack 210 moves towards the discharging end till the stopping arm 250 is in contact with the ejector rod 214; along with continuous movement of the receiving rack 210, the relative distance between the movable receiving plate 212 and the fixed receiving plate 211 is increased, and when the distance between the movable receiving plate 212 and the fixed receiving plate 211 is larger than the size of the unprinted sample container, the unprinted sample containers fall between the two auxiliary rotating shafts 224, then the receiving rack 210 returns to the receiving end, and then the third rotating motor 222 drives the primary rotating shaft 223 to rotate, so that the two auxiliary rotating shafts 224 rotate, and therefore, the unprinted sample containers rotate, thereby, the blank region on the unprinted sample containers is in a fully exposed state. Finally, the patient information is printed to the blank region by the printing mechanism 300, and then it moves towards the discharging end via the receiving rack 210. When the ejector block 262 leans against the auxiliary rotating shaft 224, the auxiliary rotating shaft 224 is pushed to move along the first guide slot 2211 to pull open the relative distance between the two auxiliary rotating shafts 224 so as to output the printed sample containers from the discharging plate 230.

The specific embodiments described herein are merely illustrations of spirit of the present invention. Various modifications or supplements can be made on the described specific embodiments or can be replaced a similar manner by those skilled in the art without deviating from the spirit of the present invention or surpassing the scope defined by the attached claims.

What is claimed is:

1. A multi-sample container disposal module, characterized by comprising:

a discharging mechanism comprising a storage box, the storage box being internally provided with a storage space for storing a sample container and two ends of the storage space being respectively provided with a feeding end and a falling end, wherein the storage space is internally provided with a partition plate to divide the storage space into a first storage cavity and a second storage cavity;

a transition mechanism, two ends of which are respectively a receiving end and a discharging end, wherein the receiving end is provided with a receiving rack for receiving the sample container falling from the falling end, the discharging end is provided with a rotating structure that exposes a blank region on the sample container completely, and a driving structure that transports the sample container on the receiving rack to the rotating structure is arranged between the receiving rack and the rotating structure; and a printing mechanism located above the transition mechanism, wherein the printing mechanism comprises a laser head, and position of an emission light source of the laser head corresponds to a position of the rotating structure up and down;

the feeding end is provided with a single feed inlet or two feed inlets, wherein when there are two feed inlets, the two feed inlets are respectively located in two sides of the storage box and are correspondingly communicated with the first storage cavity and the second storage cavity, respectively; and the discharging end is provided with a single discharge hole or two discharge holes, wherein when there are two discharge holes, the two discharge holes are formed in parallel and are communicated with the first storage cavity and the second storage cavity, respectively.

2. The multi-sample container disposal module according to claim 1, characterized in that the discharge hole is provided with a rotatable falling wheel, wherein a surface of the falling wheel is provided with a falling trough, and the falling trough is sunken towards a center of the falling wheel along a surface of the falling wheel.

3. The multi-sample container disposal module according to claim 1, characterized in that the partition plate comprises a first baffle detachably connected to the storage box and a second baffle rotatably matched with the first baffle, wherein the feed inlet is movably connected with a door plank, and the door plank and the second baffle form a linking structure via a connecting rod.

4. The multi-sample container disposal module according to claim 1, characterized in that the receiving rack is provided with a fixed receiving plate and a movable receiving plate, and opposite sides of the fixed receiving plate and the movable receiving plate are respectively provided with guiding inclined planes that are respectively a first guiding inclined plane and a second guiding inclined plane, wherein a falling channel and a receiving trough are formed by opening and closing the first guiding inclined plane and the second guiding inclined plane.

5. The multi-sample container disposal module according to claim 4, characterized in that the discharging end is provided with a stopping arm and the stopping arm is located on a moving trajectory of the receiving rack, wherein the first guiding inclined plane and the second guiding inclined plane are opened and closed as the stopping arm and the movable receiving plate lean against each other or are separated from each other.

6. The multi-sample container disposal module according to claim 4, characterized in that the fixed receiving plate is matched with the movable receiving plate magnetically, wherein the fixed receiving plate is connected with a magnetic block, the movable receiving plate is connected with an ejector rod, and the ejector rod penetrates through the fixed receiving plate and the magnetic block and is spirally connected to the movable receiving plate.

7. The multi-sample container disposal module according to claim 5, characterized in that the receiving rack is connected with a pushing structure and the pushing structure is located between the receiving trough and the stopping arm, wherein two auxiliary rotating shafts are separated at a relative distance via the pushing structure.

8. The multi-sample container disposal module according to claim 7, characterized in that the pushing structure comprises a pushing bracket and the pushing bracket is connected with an ejector block, wherein the ejector block is provided with a first working inclined plane and a second working inclined plane, the first working inclined plane and the second working inclined plane being adjacent two inclined planes on the ejector block.

9. The multi-sample container disposal module according to claim 1, characterized in that the rotating structure comprises a rotating bracket and the rotating bracket is provided with a third rotating motor, wherein an output end of the third rotating motor is connected with a primary rotating shaft and two auxiliary rotating shafts fitting the primary rotating shaft and being connected to the rotating bracket, and a "tripod"-shaped structure is formed between the primary rotating shaft and the two auxiliary rotating shafts, and wherein the two auxiliary rotating shafts are driven to rotate as the primary rotating shaft rotates.

10. The multi-sample container disposal module according to claim 9, characterized in that the primary rotating shaft is embedded with an annular magnetic ring, or the auxiliary rotating shafts are embedded with annular magnetic rings, or both the primary rotating shaft and the auxiliary rotating shafts are embedded with annular magnetic rings.

11. The multi-sample container disposal module according to claim 1, characterized in that a cavity wall of the storage cavity close to one end of the feed inlet is provided with a first guiding inclining plate, and the first baffle close to one end of the discharge hole is provided with a second guiding inclining plate.

12. The multi-sample container disposal module according to claim 3, characterized in that two sides of the door plank are respectively provided with sealing plates, wherein the sealing plates are located in the storage space or are embedded into side plates on two sides of the storage box.

13. A multi-sample container disposal system, characterized by comprising a plurality of multi-sample container disposal modules according to claim 1, wherein the plurality of multi-sample container disposal modules are divided into two groups and transportation mechanisms are arranged between two groups of multi-sample container disposal modules.

* * * * *